US009817830B2

(12) United States Patent
Hacid et al.

(10) Patent No.: US 9,817,830 B2
(45) Date of Patent: Nov. 14, 2017

(54) MANAGEMENT OF TAGS RELATING TO SHARED MULTIMEDIA OBJECTS IN A TELECOMMUNICATIONS NETWORK

(75) Inventors: Hakim Hacid, Nozay (FR); Johann Stan, Saint-Etienne (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1319 days.

(21) Appl. No.: 13/503,530

(22) PCT Filed: Oct. 20, 2010

(86) PCT No.: PCT/EP2010/065824
§ 371 (c)(1),
(2), (4) Date: Apr. 23, 2012

(87) PCT Pub. No.: WO2011/048157
PCT Pub. Date: Apr. 28, 2011

(65) Prior Publication Data
US 2012/0209917 A1    Aug. 16, 2012

(30) Foreign Application Priority Data

Oct. 23, 2009    (FR) .................................... 09 57449

(51) Int. Cl.
*G06F 17/30*    (2006.01)
(52) U.S. Cl.
CPC .. *G06F 17/30038* (2013.01); *G06F 17/30029* (2013.01); *G06F 17/30699* (2013.01); *G06F 17/30867* (2013.01)

(58) Field of Classification Search
CPC ......... G06F 17/30029; G06F 17/30867; G06F 17/30699; G06F 17/30038
(Continued)

(56) References Cited

U.S. PATENT DOCUMENTS 7,676,557 B1 *    3/2010  Behl et al. .................... 709/220
7,689,682 B1 *    3/2010  Eldering et al. .............. 709/223
(Continued)

FOREIGN PATENT DOCUMENTS

EP    1 132 847 A2    9/2001

OTHER PUBLICATIONS

Lajmi et al., "Extended Social Tags: Identity Tags Meet Social Networks," Computational Science and Engineering, IEEE, pp. 181-187, XP031544671, Aug. 29, 2009.
(Continued)

*Primary Examiner* — Jimmy H Tran
(74) *Attorney, Agent, or Firm* — Fay Sharpe, LLP

(57) ABSTRACT

To manage at least one user tag (EtU) which is associated with a multimedia object (ObM) held by a user and stored in memory on an application server (SA), the user tag being liable to be accessed by at least one other user through a telecommunications network (RT), the application server (SA) semantically analyzing the user tag (EtU) to determine a structured set (VoS) of confidentiality tags (EtC). When another user accesses the user tag (EtU), the application server determines the social category of the other user in relation to the user and selects a confidentiality tag (EtC) from the structured set (VoS) relating to the user tag (EtU) based on the determined social category. The selected confidentiality tag (EtC) is sent to the other user.

8 Claims, 2 Drawing Sheets

Figure 1:
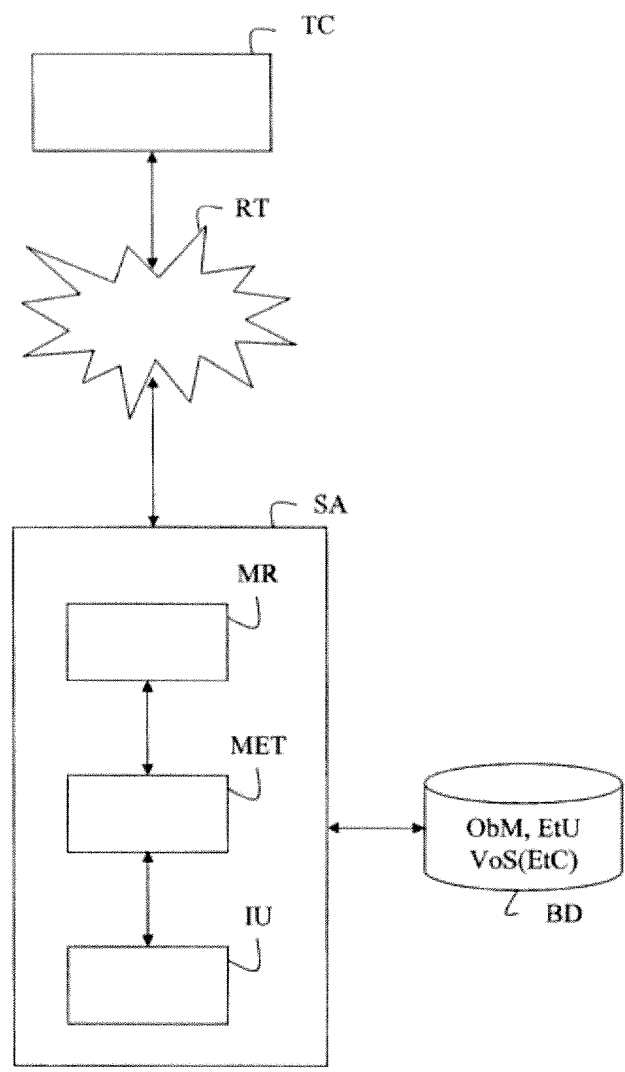

(58) Field of Classification Search
USPC .......................................................... 709/204
See application file for complete search history.

(56) References Cited

U.S. PATENT DOCUMENTS

| | | | |
|---|---|---|---|
| 7,730,216 B1* | 6/2010 | Issa et al. ..................... 709/250 |
| 7,788,358 B2* | 8/2010 | Martino ........................ 709/223 |
| 7,801,956 B1* | 9/2010 | Cumberbatch et al. ...... 709/204 |
| 7,966,647 B1* | 6/2011 | Igoe et al. ........................ 726/2 |
| 8,024,328 B2* | 9/2011 | Dolin et al. ................... 707/723 |
| 8,140,566 B2* | 3/2012 | Boerries et al. .............. 707/769 |
| 2008/0040428 A1* | 2/2008 | Wei et al. ..................... 709/204 |
| 2009/0085762 A1* | 4/2009 | Yuki et al. ................. 340/691.6 |
| 2009/0086720 A1* | 4/2009 | Westlake ..................... 370/352 |
| 2009/0119572 A1* | 5/2009 | Koivunen ..................... 715/206 |
| 2009/0234815 A1* | 9/2009 | Boerries et al. .................. 707/3 |
| 2009/0240564 A1* | 9/2009 | Boerries et al. ................ 705/10 |
| 2010/0274815 A1* | 10/2010 | Vanasco ........................ 707/798 |
| 2012/0001919 A1* | 1/2012 | Lumer .......................... 345/440 |

OTHER PUBLICATIONS

Carminati et al., "A Semantic Web Based Framework for Social Network Access Control," SACMAT, pp. 177-186, XP002586238, Jun. 3, 2009.
Felt et al., "Privacy Protection for Social Networking Platforms," Workshop on Web 2.0 Security and Privacy, pp. 1-8, XP002586239, May 22, 2008.
Barker et al., "A Data Privacy Taxonomy," Dataspace: The Final Frontier, pp. 42-54, XP019123661, Jul. 7, 2009.
International Search Report for PCT/EP2010/065824 dated Mar. 4, 2011.

* cited by examiner

MANAGEMENT OF TAGS RELATING TO SHARED MULTIMEDIA OBJECTS IN A TELECOMMUNICATIONS NETWORK

BACKGROUND OF THE INVENTION

The present invention concerns the management of tag information relating to shared multimedia objects in a telecommunication network, for example, over a social network.

Currently, there are social networking environments in which users can share various types of multimedia objects, such as text, images, and videos. This type of environment relies primarily upon the following three concepts: a user, a shared multimedia object, and a set of tags describing the multimedia object. One important aspect of sharing multimedia objects is the confidentiality of information in all tags accessible by the users.

Sharing multimedia objects typically takes place among users having a given social relationship. A user may wish to make certain information in the set of tags accessible another given user according to the social relationship between the users.

On social networking websites, a confidentiality strategy is implemented in relation to various digital content, such as addresses or telephone numbers, and makes it possible to define a confidentiality level for each piece of content in relation to one or more users, the content being visible or not for a given user.

There are no means for a user to share a multimedia object associated with a set of tags while controlling which information contained in the set of tags will be accessible to other users.

BRIEF SUMMARY OF THE INVENTION

One goal of the invention is to remedy the aforementioned disadvantages by offering the user the ability to provide other users with information from the tags associated with a multimedia object, information that is respectively different depending upon the other user viewing it.

To achieve this goal, a method according to the invention to manage at least one user tag associated with a multimedia object held by a user and stored in memory on an application server, the user tag being liable to be accessed by at least one other user through a telecommunication network, comprises the following steps on the application server:

Semantically analysing the user tag to determine a structured set of confidentiality tags, When another user accesses the user tag, determining the social category of the other user in relation to the user and selecting a confidentiality tag from the structured set relating to the user tag based on the determined social category, Sending the selected confidentiality tag to the other user.

Advantageously, the invention adds granularity to the confidentiality and access to the information contained in the tag sets. The user can keep his or her habits for multimedia object sharing and identify tag sets related to these multimedia objects, while guaranteeing that various pieces of information from the tags, of different confidentiality types, will be accessible by users accessing these tags.

According to another characteristic of the invention, the structured set of confidentiality tags may be a structured vocabulary hierarchically modelling the relationships among the confidentiality tags.

According to other characteristics of the invention, an expression comprised in the user tag may be included in the structured set that was previously stored in memory on the application server. Also, an expression comprised in the user tag may not be included in a structured set that was previously stored in memory on the application server, and new confidentiality tags having hierarchical links among them may be generated and associated with the structured vocabulary.

The invention also pertains to an application server to manage at least one user tag associated with a multimedia object held by a user and stored in memory on the application server, the user tag being liable to be accessed by at least one other user through a telecommunication network, the application server comprising:

means for semantically analysing the user tag to determine a structured set of confidentiality tags, means to determine, when another user accesses the user tag, the social category of the other user in relation to the user and selecting a confidentiality tag from the structured set relating to the user tag based on the determined social category, means to send the selected confidentiality tag to the other user.

The invention also pertains to a computer program capable of being implemented within a server, said program comprising instructions which, whenever the programs are executed within said server, carry out the steps according to the inventive method.

BRIEF DESCRIPTION OF THE SEVERAL VIEWS OF THE DRAWING(S)

Figure 2:
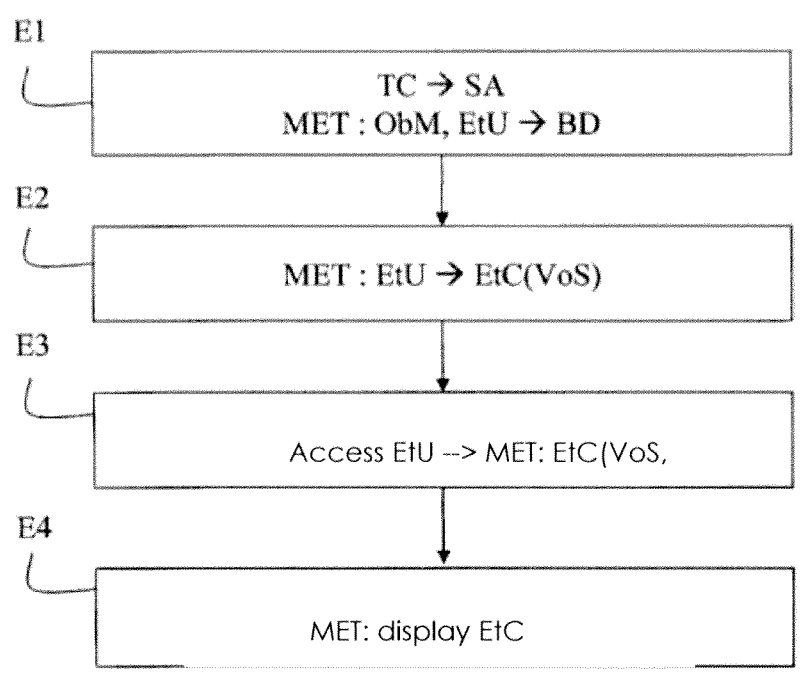

The present invention and the benefits thereof shall be better understood upon examining the description below, which makes reference to the attached figures, in which:

FIG. 1 is a schematic block diagram of a communication system to manage tags associated with multimedia objects according to one embodiment of the invention; and FIG. 2 is an algorithm for a method for managing tags associated with multimedia objects according to one embodiment of the invention.

DETAILED DESCRIPTION OF THE INVENTION

The invention relates to the management of tag information relating to multimedia objects stored in memory on an application server and shared over a telecommunication network.

In the following description, the application server provides a social networking service, in particular for sharing multimedia objects among various users. A tag may be defined as a set of terms or expressions, for example key words, that is associated with a multimedia object and that provides an explanation of the multimedia object.

In particular, a user holds a multimedia object that is associated with a set of tags in the application server and that can be viewed by other users. The user may wish to share the multimedia object, such as an image or a photograph, with different explanations depending upon the user viewing the multimedia object.

With reference to FIG. 1, a communication system according to the invention comprises an application server SA and at least one communication terminal TC, capable of communicating with one another through a telecommunication network RT.

The telecommunication network RT may be a wired or wireless network, or a combination of wired and wireless networks. For example, the telecommunication network RT is a high-speed IP ("Internet Protocol") packet network, such as the Internet or an intranet.

In one example, a communication terminal TC is a personal computer directly linked by modem to an xDSL ("Digital Subscriber Line") or ISDN ("Integrated Services Digital Network") link connected to the telecommunication network RT.

In another example, a communication terminal TC is a mobile cellular radiocommunication terminal, linked to the telecommunication network by a radiocommunication channel, for example of the GSM ("Global System for Mobile communications") or UMTS ("Universal Mobile Telecommunications System") type.

In another example, a communication terminal TC comprises an electronic telecommunication device or object that may be a personal digital assistant (PDA) or a smartphone, capable of being connected to an antenna on a public wireless local area network WLAN, a network using the 802.1x standard, or a wide area network using the WIMAX ("World wide Interoperability Microwave Access") protocol, connected to the telecommunication network.

The application server SA comprises a relationship module MR, a tagging module MET, and a user interface IU.

In the remainder of the description, the term module may designate a device, a software program, or a combination of computer hardware and software, configured to execute at least one particular task.

The application server SA is linked to a database BD that is integrated into the application server SA or incorporated into a database management server linked to the application server by a local or remote link.

In particular, the database BD contains multimedia objects ObM stored in memory with user tag sets EtU, and one or more structured vocabularies VoS comprising confidentiality tags EtC related to the user tags.

The relationship module MR manages the social relationships among various users, and in particular the social links held by a user with other users as defined by the social networking service provided by the application server SA.

In a social network, users can be modelled in graphs representing the social relationships that may exist among users, these social relationships being defined according to a not of categories. This set of categories may comprise for example: "Family", "Friends", "Colleagues", "Strangers", or "Null". Each user has a social relationship with another user according to one of the previous categories, or a "Null" relationship when there is no relationship between the pair of users, this relationship being unique to the user and not being symmetrical within a user pair. From a confidentiality perspective, the social categories define a hierarchy among users in relation to a given user, a hierarchy according to which information access depends upon the user's social category.

One such hierarchy may be established according to the following order: "Family", "Friends", "Colleagues", "Strangers", or "Null", since a user may prefer to share information about his or her private life with his or her family or friends rather than with colleagues. Conversely, a user may prefer to share information about his or her professional life with colleagues rather than with friends.

The tagging module MET controls the level of detail of the information, more specifically, the precision of the granularity of this information, which is related to a user tag EtU associated with a multimedia object ObM and accessible to users. The user holds one or more multimedia objects ObM stored in memory on the application server SA and associated with sets of user tags EtU concerning the multimedia objects.

In one embodiment, the confidentiality tags EtC may be shown in the form of an ontology, which is a vocabulary modelling the relationships among tags, the user, and the multimedia objects. An ontology may be defined as a semantic network bringing together a set of concepts describing a domain and linked to each other by taxonomic and semantic relationships.

For example, the set of tags {Alice, my girlfriend. Alice's birthday party} is more precise than the set of tags {Alice, friend, party}.

Each user tag EtU is related to a specific domain and a specific meaning. A user tag EtU is therefore related to a structured vocabulary VoS that positions the user tag EtU in a hierarchy of confidentiality tags EtC to specify the level of detail in the user tag EtU. A structured vocabulary defines an order to the confidentiality tags EtC according to the level of semantic detail.

In one embodiment, the tagging module MET implements a function $\omega$ that changes the form of a confidentiality tag EtC to give it another form with more or fewer details, according to a relaxation parameter related to the structured vocabulary VoS.

The degree of granularity of a confidentiality tag EtC, controlled by the relaxation parameter, may be specified by the user based on a given set of criteria that may be related for example to categories of social relationships such as "Family" or "Friends". In one example, the user stores a multimedia object such as a photograph in memory on the application server SA, and said photograph is associated with a confidentiality tag EtC "Birthday Party". This tag is considered to have the highest degree of granularity among the following corresponding confidentiality tags EtC in the structured vocabulary "Private Social Event", "Social Event" and "Event". The user can also define four social categories as criteria for the degree of granularity: "Family", "Friends", "Friends of Friends", and "Strangers". The function $\omega$ determines the degrees of granularity for the confidentiality tag EtC according to the social category of the user viewing the user tag EtU:

$\omega$("Birthday Party", "Family")="Birthday Party"
$\omega$("Birthday Party", "Friends")="Private Social Event"
$\omega$("Birthday Party, "Friends of Friends")="Social Event"
$\omega$("Birthday Party", "Strangers")="Event"

A structured vocabulary VoS provides a hierarchical view of a given piece of information included in a user tag EtU, each level in the hierarchy corresponding to a level of granularity, which is to say the level of detail in the information. In the example above describing the part of the branch of the structured vocabulary in the following order {"Event", "Social Event", "Private Social Event", "Birthday Party"}, it will be understood that the vocabulary, in a tree structure, may contain other branches such as {"Private Social Event", "Birthday Party", "Wedding Anniversary"}, {"Private Social Event", "Birthday Party", "Birthday Party"}, or {"Social Event", "Private Social Event"} and {"Social Event", "Public Social Event"}.

Additionally, it may be possible for the user to fill out a user tag EtU with information to be potentially accessible in as detailed a manner as possible by other users. Moreover, there may be more or fewer social categories than the number of different levels of granularity related to a user tag in the structured vocabulary. Various social categories may also be associated with the same level of granularity that is to say with the same confidentiality tag EtC in the structured vocabulary VoS in relation to a user tag EtC.

The user interface IU is a graphical user interface GUI that makes it possible in particular for the user to define new social categories with other users and to define rules for assigning a level of granularity to a user tag EtU based on the social category of another user liable to view the user tag EtU.

With reference to FIG. 2, a method for managing tags associated with multimedia objects according to one embodiment of the invention comprises steps E1 to E4 executed within the communication system.

In step E1, a user connects to the application server SA through a communication terminal TC. The tagging module MET asks the user to upload a multimedia object ObM and fill out a set of user tags EtU, the set may be reduced to a single tag, associated with the multimedia object to describe it.

The multimedia object ObM and the set of user tags EtU are stored in memory together in the database BD. For example, the multimedia object ObM and the user tags EtU are also stored in memory together with an identifier of the user holding the multimedia object ObM.

In step E2, the tagging module MET semantically analyses each user tag EtU, which is to say it semantically analyses the content of the expression or key words included in the user tag EtU, to determine a structured vocabulary VoS related to the user tag, and to deduce from it a confidentiality tag EtC corresponding to the user tag EtU and a hierarchy of tags that contains the deduced tag and that is contained in the structured vocabulary VoS.

In a first case, if the user tag EtU comprises an expression that is included in the structured vocabulary VoS, the module MET identifies the structured vocabulary already stored in memory in the database BD and a confidentiality tag EtC comprising this expression in the structured vocabulary.

Alternatively, the user tag EtU comprises an expression that is semantically close to the meaning of another expression included in the structured vocabulary VoS and the module MET identifies a confidentiality tag EtC comprising said other expression in the structured vocabulary. For example, the user tag EtU contains the expression "Party", which is close to another expression "Celebration" included in the structured vocabulary VoS.

In a second case, if the user tag EtU comprises an expression that is not included in the structured vocabulary VoS, or that is not semantically close to the meaning of another expression included in the structured vocabulary VoS, the module MET generates new confidentiality tags EtC with hierarchical links between them and adds them to the structured vocabulary VoS. In this case, the tagging module MET may optionally suggest new confidentiality tags EtC to the user for confirmation.

As an example, a structured vocabulary VoS for a tag of the category "Event" comprises {"Event", "Social Event", "Private Social Event", "Party"}. In the first case, the user fills out a user tag EtU with the expression "Party", and the module MET identifies the confidentiality tag EtC comprising this expression in the structured vocabulary VoS. In the second case, the user fills out a user tag EtU with the expression "My son's birthday party", and the module MET generates the new confidentiality tags EtC "Birthday Party" and "My son's birthday party" with hierarchical links and adds them to the structured vocabulary VoS as follows: {"Event", "Social Event", "Private Social Event", "Party", "Birthday Party", "My son's birthday party"}.

In step E3, another user, having a social relationship to the user through the social networking service provided by the application server, wishes to view the user tag EtU associated with the multimedia object ObM shared over the telecommunication network RT.

The tagging module MET determines the social category of the other user in relation to the user together with the relationship module MR, and selects a confidentiality tag EtC in the structured vocabulary VoS related to the user tag EtC, based on the determined social category. For example, the other user is identified through an identifier to which a social category is associated.

Step E3 may be carried out for example when the other user is signed onto the web page where the multimedia object and the related user tag are displayed. In other examples, step E3 may be carried out when the user selects the multimedia object or moves a cursor into a zone where the multimedia object is displayed. In general, it will be considered that step E3 will be carried out when said other user accesses the user tag EtU.

In Step E4, the tagging module MET displays the selected confidentiality tag EtC and provides this confidentiality tag EtC to the other user by sending the confidentiality tag EtC to the other user's communication terminal. Therefore, the other user can read a confidentiality tag having for example less detailed information than the initially stored user tag EtU. Additionally, the selected confidentiality tag EtC may for example correspond to the initially stored user tag.

The invention described here relates in particular to a method and server for managing tags associated with multimedia objects. According to one embodiment of the invention, the steps of the inventive method are determined by the instructions of a computer program incorporated into a server, such as the application server SA. The program comprises program instructions that, when said program is loaded and executed within the server, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method to manage at least one user tag associated with a multimedia object held by a user and stored in memory on an application server, the user tag being liable to be accessed by at least one other user through a telecommunication network, comprises the following steps on the application server:

Semantically analysing the user tag to determine a structured set of confidentiality tags, When another user accesses the user tag, determining the social category of the other user in relation to the user and selecting a confidentiality tag from the structured set relating to the user tag based on the determined social category, Sending the selected confidentiality tag to the other user.

2. The method according to claim 1, wherein the structured set of confidentiality tags is a structured vocabulary hierarchically modelling the relationships among the confidentiality tags.

3. The method according to claim 1, wherein an expression comprised in the user tag is included in the structured vocabulary that was previously stored on the application server.

4. The method according to claim 1, wherein an expression comprised in the user tag are not included in a structured set that was previously stored in memory on the application server and new confidentiality tags having hierarchical links among them are generated and added the structured vocabulary.

5. The method according to claim 1, wherein the selected confidentiality tag corresponds to the user tag.

6. The method according to claim 1, wherein the social category of the other user in relation to the user is determined based on a social relationship that the user holds with the other user as defined by a social networking service managed by the application server.

7. An application server to manage at least one user tag associated with a multimedia object held by a user and stored in memory on the application server, the user tag being liable to be accessed by at least one other user through a telecommunication network, the application server being configured to:
   semantically analyze the user tag to determine a structured set of confidentiality tags,
   determine, when another user accesses the user tag, the social category of the other user in relation to the user,
   select a confidentiality tag in the structured set relating to the user tag based on the determined social category, and
   send the selected confidentiality tag to the other user.

8. A computer program capable of being implemented on an application server to manage at least one user tag associated with a multimedia object held by a user and stored in memory on the application server, the user tag being liable to be accessed by at least one other user through a telecommunication network, said program comprising instructions that, when the program is loaded and executed on said application server, the computer program comprising instructions for:
   Semantically analysing the user tag to determine a structured set of confidentiality tags,
   When another user accesses the user tag, determining the social category of the other user in relation to the user and selecting a confidentiality tag from the structured set relating to the user tag based on the determined social category, and
   Sending the selected confidentiality tag to the other user.

* * * * *